United States Patent [19]

Tessler

[11] 4,276,414

[45] Jun. 30, 1981

[54] NOVEL ZWITTERION POLYGALACTOMANNAN ETHER DERIVATIVES AND A METHOD FOR THE PREPARATION THEREOF

[75] Inventor: Martin M. Tessler, Edison, N.J.

[73] Assignee: National Starch and Chemical Corporation, Bridgewater, N.J.

[21] Appl. No.: 189,397

[22] Filed: Sep. 22, 1980

Related U.S. Application Data

[63] Continuation-in-part of Ser. No. 107,347, Dec. 26, 1979, abandoned.

[51] Int. Cl.$^3$ .................... C08B 37/00; C07G 17/00
[52] U.S. Cl. .................... 536/114; 536/120; 536/122
[58] Field of Search .............. 536/114, 117, 116, 120, 536/52

[56] References Cited

U.S. PATENT DOCUMENTS

| | | | |
|---|---|---|---|
| 2,477,544 | 7/1949 | Moe | 260/209 |
| 2,520,161 | 8/1950 | Moe | 260/209 |
| 3,723,408 | 3/1973 | Nordgren et al. | 260/209 |
| 3,723,409 | 3/1973 | Yueh | 260/209 |
| 4,031,306 | 6/1977 | DeMartino et al. | 536/114 |
| 4,031,307 | 6/1977 | DeMartino et al. | 536/114 |

Primary Examiner—Johnnie R. Brown
Assistant Examiner—Blondel Hazel
Attorney, Agent, or Firm—Edwin M. Szala; Margaret B. Kelley

[57] ABSTRACT

Zwitterion polygalactomannan ether derivatives are prepared by reacting a polygalactomannan gum, such as guar gum or locust bean gum, with N-(2-haloethyl)iminobis(methylene)diphosphonic acid or with a N-(alkyl)-N-(2-haloethyl)aminomethylphosphonic acid. The derivatives contain aminophosphonic acid groups (or their salts) as zwitterion substituents which consist of either one or two anionic methylene phosphonic acid groups bound to a cationic nitrogen. Modified derivatives containing non-ionic, anionic, cationic, or cationogenic substituents may also be prepared.

12 Claims, No Drawings

NOVEL ZWITTERION POLYGALACTOMANNAN ETHER DERIVATIVES AND A METHOD FOR THE PREPARATION THEREOF

This application is a continuation-in-part of my copending application, Ser. No. 107,347, filed Dec. 26, 1979, now abandoned.

BACKGROUND OF THE INVENTION

This invention relates to novel zwitterion polygalactomannan ether derivatives and to a method for their preparation. It also relates to modified polygalactomannan ether derivatives which contain, in addition to the novel zwitterion substituent groups, other non-ionic, anionic, cationic, or cationogenic substituent groups and to a method for their preparation.

As used herein, the term "zwitterion polygalactomannan ether derivatives" includes amphoteric polygalactomannan ether derivatives wherein the anionic and cationic or cationogenic substituent groups are both bonded to the same reaction site on the polygalactomannan molecule through a zwitterion substituent group. The term "cationogenic" refers to non-ionic substituents capable of forming cations, e.g. diethylaminoethyl ether substituents.

Polygalactomannan ether derivatives are well-known in the art and useful in the petroleum industry as oil well drilling muds and oil well fracturing aids, in the textile industry for sizing, printing and finishing operations, and in the paper industry as beater additives and sizing and coating agents. Typical derivatives may contain non-ionic groups, such as $C_3$-$C_8$-hydroxyalkyl groups or allyl groups, anionic groups, such as carboxyalkyl groups or 2-hydroxy-3-sulfopropyl groups; cationic groups, such as quaternary or tertiary amine groups; and mixed ether groups, such as carboxyalkyl and hydroxyalkyl groups.

It is an object of this invention to provide novel zwitterion polygalactomannan ether derivatives and modified zwitterion polygalactomannan ether derivatives which will be useful in the paper industry as beater additivers, sizing and coating agents, and pigment retention aids, as in well as the textile and petroleum industries.

SUMMARY OF THE INVENTION

The above object is achieved by the preparation of novel zwitterion polygalactomannan ether derivatives of the general structures (i) or (ii) or a combination of (i) and (ii),

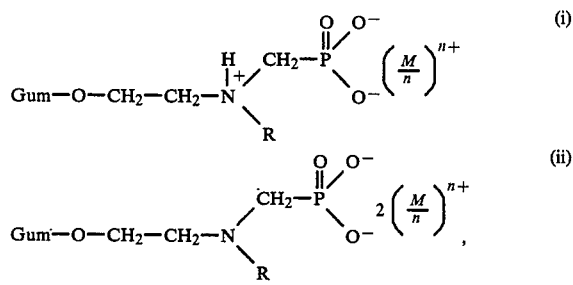

wherein Gum-O represents a polygalactomannan molecule or a modified polygalactomannan molecule (wherein the hydrogen of a hydroxyl group of a mannose or galactose unit has been replaced as shown); R is a $C_1$-$C_6$ straight or branched chain alkyl group, a $C_3$-$C_6$ cycloaklyl group, or a

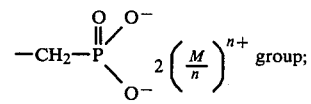

M is the same or different cation(s); and n is the valence number of M. The zwitterion polygalactomannan ether derivatives are prepared by reacting polygalatomannan gum with about 0.1 to 100% by weight, based on dry gum, of N-(2-haloethyl)iminobis(methylene)diphosphonic acid or with about 0.1 to 100% by weight, based on dry gum, of a N-alkyl-N-(2-haloethyl)-aminomethylphosphonic acid and isolating the resulting gum derivatives. The reactions are carried out under alkaline conditions in an aqueous solution containing a water-miscible solvent.

The zwitterion gum ether derivatives may be modified to increase their cationic or anionic characteristics. When increased anionic properties are desired, anionic substituent groups, such as carboxymethyl groups, are introduced into the gum molecule using suitable reagents. When increased cationic properties are desired, cationic or cationogenic substituent groups, such as 3-(trimethylammonium chloride)-2-hydroxypropyl ether groups or diethyl aminoethyl ether groups, are introduced into the gum molecule using suitable reagents. The zwitterion gum ether derivatives may also be modified by the introduction of non-ionic substituent groups such as 2-hydroxypropyl ether groups. Reaction with the non-ionic, anionic, cationic, or cationogenic reagent may be carried out prior to or after reaction with the aminophosphonic acid (or salt) reagent or the two reactions may be carried out simultaneously.

The zwitterion gum ether derivatives and modified zwitterion gum ether derivatives may be used as wet end additives and in many other applications wherein gum ether derivatives are commonly used. They are particularly useful as pigment retention aids in papermaking processes.

DESCRIPTION OF THE PREFERRED EMBODIMENTS

The "polygalactomannan gums" suitable for reaction herein are heteropolysaccharides composed principally of long chains of mannose units and single unit side chains of galactose units. They are commonly found in the endosperm of certain seeds of the plant family "Leguminosae", such as the seeds of guar, locust bean, honey locust, flame tree, and the like. They may be used in the form of endosperm "splits", i.e. tough, non-brittle endosperm sections (see U.S. Pat. No. 3,132,681 for a method for separating the splits) or preferably in the form of purified or unpurified ground endosperm (see U.S. Pat. Nos. 2,891,050 and 3,455,899). Also suitable for use herein are gum degradation products resulting from the hydrolytic action of acid, heat, shear, and/or enzymes; oxidized gums; derivatized gums such as esters or ethers; and other typical carbohydrate modifications.

The preferred gums are guar gum and locust bean gum because of their commercial availability. Guar gum is essentially a straight chain mannan wherein the mannose units are linked in a 1,4-$\beta$-glycosidic linkage and the galactose branching takes place by means of a 1,6 linkage on alternate mannose units (galactose to mannose ratio of 1:2). If desired, guar gum may be purified according to the method described in U.S. Pat. No. 4,031,306, in which case the residual nitrogen content will decrease from about 0.7% to less than 0.1%. Locust bean gum has a structure similar to guar gum, wherein the galactose to mannose ratio is 1:4, but wherein the branching is not uniformly spaced.

The N-(2-haloethyl)iminobis(methylene)diphosphonic acid reagent, which reacts with the gum to form zwitterion polygalactomannan ether derivatives containing amino-diphosphonic acid groups (or salt groups), may itself be prepared by reacting a 2-haloethylamine with formaldehyde and phosphorous acid in an aqueous hydrohalic acid. The method is analogous to that disclosed by K. Moedritzer and R. Irani in J. Org. Chem. 31, 1603 (1966). Specifically phosphorous acid, in a stoichiometric amount or in an excess of up to 100%, is dissolved in water and a 2-haloethylamine hydrochloride is added. Aqueous hydrohalic acid is slowly added and the mixture is heated to reflux. Formaldehyde (10-200% excess) is added, and the solution is refluxed for 1-20 hours, preferably 2-6 hours, cooled to room temperature, and stripped of excess water, formaldehyde and hydrohalic acid. The product sometimes crystallizes as a very hard mass. It is preferable to add water and alkali to the acid product to form a 20-50% aqueous solution having a pH of 1.5-2.7. The halo groups for use herein are chloro and bromo. The preferred reagents are 2-chloroethylamine hydrochloride and 2-bromoethylamine hydrobromide. The preferred hydrohalic acid is hydrochloric acid.

The N-(alkyl)-N-(2-haloethyl)aminomethylphosphonic acids, which react with the gum to form zwitterion polygalactomannan ether derivatives containing amino-monophosphonic acid groups (or salt groups), may be prepared by a variation of the procedure described above, except that a N-(2-haloethyl)alkylamine hydrochloride or hydrobromide is used as the starting material. The halo groups for use herein are chloro and bromo. Examples of suitable N-(alkyl)-N-(2-haloethyl)aminomethylphosphonic acids include the N-(methyl)-, N-(ethyl)-, N-(propyl)-, N-(butyl)-, and N-(cyclohexyl)-N-(2-haloethyl)aminomethylphosphonic acids. The alkyl groups may be linear, branched or cyclic. The preferred reagents for use herein include N-(ethyl)-, N-(n-butyl)- and N-(cyclohexyl)-N-(2-chloroethyl)aminomethylphosphonic acids.

The N-(2-haloethyl)alkylamine hydrochlorides, which are used in the preparation of the amino-monophosphonic acid reagents, are themselves prepared by reacting a 2-(alkylamino)ethanol with thionyl chloride in an organic solvent. Specifically, a 2-alkylamino)ethanol is added to toluene and the solution is cooled to −10° C. A solution of thionyl chloride in an organic solvent (e.g. toluene) is slowly added while maintaining the temperature at below −10° C. Additional toluene may be added and the temperature is increased to abut 75°-100° C. The solution is agitated for 1 hour, cooled and then maintained at 75°-82° C. for 3 hours. After cooling to room temperature, the insoluble product is recovered by filtration. The preferred reagents for use herein include 2-(ethylamino)ethanol, 2-(n-butylamino)ethanol, and 2-(cyclohexylamino)-ethanol.

These reagents will be referred to herein as zwitterion reagents and this term is meant to include both the N-(2-haloethyl)iminobis(methylene)disphosphonic acids and the N-(alkyl)-N-(2-haloethyl)aminomethylphosphonic acids. The practitioner will recognize that these zwitterion reagents are acids or partially neutralized acids under the conditions used for their preparation and storage but are acid salts under the alkaline conditions used for their reactions with the gum.

The practitioner will recognize that the reaction conditions used in the above reagent preparations may have to be altered depending on the nature of the starting materials and that it may be possible to prepare the reagents by other methods.

The polygalactomannan reactions of this invention are represented by the equations below:

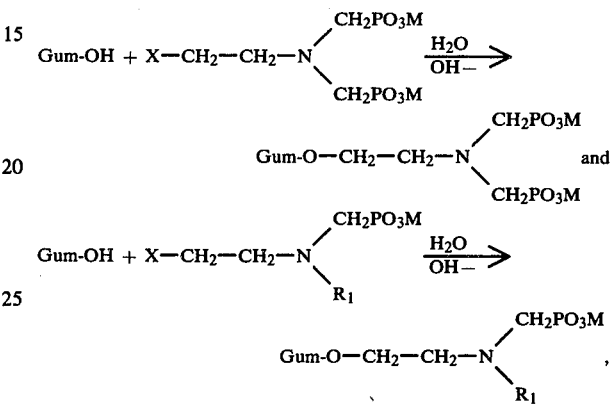

wherein Gum is a polygalactomannan gum base or a modified gum base such as non-ionic, anionic, cationic, or cationogenic gums; X is a halogen, preferably chlorine or bromine; $R_1$ is a $C_1-C_6$ straight or branched chain alkyl group or a $C_3-C_6$ cycloalkyl group; and M is one or more cations depending on the valence of M, preferably selected from the group consisting of hydrogen, ammonium, alkali, and alkaline earth metals. The practitioner will recognize that at the high pH of the gum reactions the nitrogen may not be protonated; however the nitrogen will become protonated if the excess alkali is neutralized before isolating the derivative.

The polygalactomannan ether derivatives prepared by the above reactions are referred to herein as zwitterion polygalactomannan ether derivatives, and this term is meant to include those derivatives which contain the amino-diphosphonic acid (or salt) as well as those which contain the amino-monophosphonic acids (or salts). The practitioner will recognize that these derivatives may be either acids, salts, or partial salts depending upon the pH of the solution wherein they are used.

The practitioner will also recognize that the gum molecule is a polymer which contains many anhydro sugar units, each having on the average three available hydroxyl sites which may react with reagent. Thus, the number of such displacements or the degree of substitution (D.S.) will vary with the particular gum, the ratio of reagent to gum, and, to some extent, the reaction conditions. Furthermore, since it is known that the relative reactivity of each of the hydroxyl groups within the anhydro sugar unit is not equivalent, it is probable that some will be more reactive with the reagent than others.

In the method of this invention, the reaction is carried out in a two-phase reaction system comprising an aqueous solution of a water-miscible solvent and water-soluble zwitterion reagent in contact with the solid polygalactomannan gum. The water content may vary from 10–60% by weight depending upon the water-miscible solvent selected. If too much water is present in the reaction system, the gum may swell or enter into solution thereby complicating recovery and purification of the gum derivative.

The water-miscible solvent is added in an amount sufficient for the preparation of a gum suspension which can be agitated and pumped. The weight ratio of water-miscible solvent to gum may vary from 1:1 to 10:1, preferably from 1.5:1 to 5:1.

Suitable water-miscible solvents for use herein include alkanols, glycols, cyclic and acylic alkyl ethers, alkanones, dialkylformamide and mixtures thereof. Typical solvents include methanol, ethanol, isopropanol, secondary pentanol, ethylene glycol, acetone, methylethylketone, diethylketone, tetrahydrofuran, dioxane, and dimethylformamide.

The amount of zwitterion reagent to be employed in the reaction with the gum herein will vary from about 0.1 to 100% by weight, based on the weight of dry gum, depending on such factors as the gum used, the zwitterion reagent used, the degree of substitution required in the end product, and, to some extent, the reaction conditions used. In general, the preferred amount of reagent to be used when preparing the zwitterion polygalactomannan ether derivatives containing aminodiphosphonic acid groups or amino-monophosphonic acid groups (or salt groups) is 1–30% by weight.

The zwitterion reagent may be added to the reaction mixture as a solid or an aqueous solution. The preferred concentration of the solution is 20–50% by weight, based on weight of reagent. In an alternative method, the zwitterion reagent solution is brought to the desired alkaline pH prior to its addition to the gum, this being accomplished by the addition of sufficient alkali. In this alternative method, the zwitterion reagent is in the form of a salt rather than an acid or partially neutralized acid when it is introduced to the reaction mixture. In another variation dry gum may be added to an alkaline solution of the aminophosphonic acid salt.

The gum reaction is carried out under alkaline conditions. Alkali may be added to the gum suspension either prior to or after the addition of the zwitterion acid reagent. Typical alkalies include sodium hydroxide, potassium hydroxide, calcium hydroxide, ammonium hydroxide, tetramethylammonium hydroxide, and the like. The preferred alkali is sodium hydroxide. Some of the alkali functions as a reactant, i.e. neutralizes the hydrochloric acid formed when the gum reacts with the zwitterion reagent, and some of the alkali functions as a catalyst. An excess of alkali is therefore required to catalyze the reaction. The excess alkali which functions as the catalyst can vary in amount from about 0.05 to 20% by weight, based on the weight of gum. This excess alkali is not consumed during the gum etherification reaction.

The reaction is carried out at a temperature of from 15°–100° C., preferably 20°–60° C. The reaction mixture is agitated under the desired reaction conditions. The reaction time may vary from 0.5 to 8 hours, depending on such factors as the amount, stability and reactivity of the zwitterion reagent employed, the temperature, the pH, the scale of the reaction, and the degree of substitution desired. In general, the preferred range of reaction times is from 1 to 5 hours.

After completion of the reaction, it is preferred that the excess alkali be neutralized with an acid such as hydrochloric acid, sulfuric acid, acetic acid, and the like.

After completion of the etherification reaction, the solid polygalactomannan zwitterion ether derivatives are separated from the reaction mixture by centrifugation or filtration. The solid derivative so recovered is preferably further treated and purified by washing with the same aqueous solution of water-miscible solvent as previously employed in the reaction and then by further washing with a more anhydrous form of the same solvent.

Modified zwitterion gum ether derivatives may also be prepared which contain, in addition to the novel zwitterion substituent groups described herein, non-ionic, anionic, cationic, or cationogenic groups. The preferred non-ionic groups are 2-hydroxypropyl groups (see U.S. Pat. No. 3,723,408 for the preparation of such non-ionic derivatives). The preferred anionic groups are carboxyalkyl groups (see U.S. Pat. Nos. 2,477,544 and 2,520,161 for the preparation of such anionic derivatives). The preferred cationic groups are quaternary amine groups, such as 3-(trimethylammonium chloride)-2-hydroxypropyl groups or 4-(trimethylammonium chloride)-2-butenyl groups (see U.S. Pat. No. 4,031,307 for the preparation of the latter cationic derivatives); the preferred cationogenic groups are tertiary amino groups, such as diethyl aminoethyl ether groups.

There are three possible ways to prepare the modified zwitterion gum ether derivatives: (1) a non-ionic, anionic, cationic, or cationogenic gum derivative is reacted with a zwitterion reagent of this invention; (2) a zwitterion gum ether derivative of this invention is reacted with a non-ionic, anionic, cationic, or cationogenic reagent(s); or (3) a gum base is reacted in one step with both a zwitterion reagent of this invention and a non-ionic, anionic, cationic, or cationogenic reagent(s).

The above reactions are carried out in the presence of excess alkali using a method similar to that used for preparing the unmodified zwitterion derivatives, i.e. a two phase reaction system comprising an aqueous solution containing a water-miscible solvent and a water-soluble reagent in contact with the solid gum. The skilled practitioner will recognize that gum esters are not very stable at high pH and, hence, zwitterion derivatives containing ester substituents must be prepared by method (2) to avoid ester hydrolysis under the alkaline conditions required to prepare the gum zwitterion derivatives.

It can be appreciated by the practitioner that a large number of variations may be effected in selecting the non-ionic, anionic, cationic, and cationogenic reagents and in reacting the gum base with the zwitterion reagents, the zwitterion and non-ionic reagent(s), the zwitterion and anionic reagent(s), and the zwitterion and cationic (or cationogenic) reagent(s) in accordance with the reaction procedures described above without materially departing from the scope and spirit of the invention. Such variations will be evident to those skilled in the art and are to be included within the scope of this invention.

The following examples will more fully illustrate the embodiments of this invention. In the examples, all parts and percentages are given by weight, all temperatures are in degrees Celsius unless otherwise noted, and D.B. indicates dry basis. The nitrogen content of any particular gum derivative may be determined by comparing the amount of nitrogen contained in the derivative with that of a control polygalactomannon gum which had been similarly treated in the absence of zwitterion reagent. The nitrogen content was determined by the Kjeldahl method.

EXAMPLE I

This example illustrates the preparation of zwitterion reagents for use in the preparation of the novel zwitterion polygalactomannon ether derivatives. The final solutions were used for the gum reactions described herein.

A. Preparation of N-(2-Chloroethyl)iminobis(methylene)diphosphonic Acid (Zwitterion Reagent A)

A total of 29 parts 2-chloroethylamine hydrochloride was added to 41.5 parts phosphorous acid in 50 parts water. Then 59 parts of 37% aqueous hydrochloric acid were added slowly over the period of about 0.5 hour, and the mixture was slowly brought to reflux over the period of about 1 hour. While maintaining reflux at a constant rate, 81 parts of 37% aqueous formaldehyde were added dropwise over a period of about 0.75 hours. The mixture was refluxed for 3 hours, cooled to 24° C. and stripped of volatiles at 40° C. in a rotary evaporator (water aspirator) to yield a concentrate. An equal amount of water (i.e. 84 parts) was added to the concentrate and the pH was raised to 1.5 with 25% aqueous sodium hydroxide while maintaining the temperature at below 35° C.

B. Preparation of N-(2-Bromoethyl)iminobis(methylene)diphosphonic Acid (Zwitterion Reagent B)

The procedure described in Preparation A was followed except that 51 parts 2-bromoethylamine hydrobromide, 100 parts of 48% aqueous hydrobromic acid and 81 parts of 37% aqueous formaldehyde were used. Then 109 parts water were added to the concentrate and the pH was raised to 2.5.

C. Preparation of N-(Ethyl)-N-(2-chloroethyl)aminomethylphosphonic Acid (Zwitterion Reagents C-1 and C-2)

The procedure described in Preparation A was followed except that 36 and 72 parts of N-(2-chloroethyl)ethylamine hydrochloride were used to prepare C-1 and C-2, respectively. Then 75 parts water were added and the pH adjusted to 1.5.

D. Preparation of N-(n-Butyl)-N-(2-chloroethyl)aminomethylphosphonic Acid (Zwitterion Reagents D-1 and D-2)

The procedure described in Preparation C was followed except that 43 and 86 parts of N-(2-chloroethyl)-n-butylamine hydrochloride were used instead of N-(2-chloroethyl)ethylamine hydrochloride to prepare D-1 and D-2, respectively.

E. Preparation of N-(Cyclohexyl)-N-(2-chloroethyl)-aminomethylphosphonic Acid (Zwitterion Reagents E-1 and E-2)

The procedure described in Preparation C was followed except that 40 parts of N-(2-chloroethyl)cyclohexylamine hydrochloride were used instead of N-(2-chloroethyl)ethylamine hydrochloride to prepare E-1.

A total of 101 parts of N-(2-chloroethyl)cyclohexylamine hydrochloride, 41.5 parts phosphorous acid in 101 parts water, 75 parts of 37% aqueous hydrochloric acid, and 104 parts of 37% aqueous formaldehyde were used to prepare E-2.

EXAMPLE II

This example illustrates the preparation of the zwitterion guar gum ether derivatives.

Guar Gum A—Derivative Containing Amino-Diphosphonic Acid Groups

A total of 30 parts of unpurified guar gum was added to 180 parts of 50% aqueous isopropanol and the suspension was stirred for one hour at 40° C. under nitrogen. Then 3.6 parts of 50% aqueous sodium hydroxide (1.8 parts D.B.) were added, and the mixture was stirred for 10 minutes at 40° C. Then 31.4 parts of a 23.9% aqueous solution of Zwitterion Reagent A (7.5 parts D.B.) and 6.5 parts of 50% aqueous sodium hydroxide (3.25 parts D.B.) were added. The reaction mixture was stirred at 40° C. for 4 hours. The pH was lowered to 8.3 with dilute acetic acid, and the guar gum derivative was recovered by filtration, washed twice with 50% aqueous isopropanol and once with isopropanol, and air dried. It contained 1.10% N (D.B.).

Guar Gum B—Control Sample

A sample of guar gum was reacted in the same manner as above, except that Zwitterion Reagent A was omitted. It contained 0.46% N (D.B.). Thus, Guar A contained 0.64% N from the aminodiphosphonic acid substituent.

Guar Gums C-1 and C-2—Derivatives Containing Amino-Monophosphonic Acid and N-Ethyl Groups A sample of guar gum was reacted in the same manner as above except that 40.7 parts of a 18.4% aqueous solution of Zwitterion Reagent C-1 (7.5 parts D.B.) were used and 6.6 parts of 50% aqueous sodium hydroxide (3.3 parts D.B.) were subsequently added. The guar derivative (C-1) contained 0.99% N (D.B.) of which 0.53% was from the amino-monophosphonic acid substituent.

The same procedure was followed except that 10.5 parts of a 43.0% aqueous solution of Zwitterion Reagent C-2 (4.5 parts D.B.) and 7.6 parts of 50% aqueous sodium hydroxide (3.8 parts D.B.) were used. The guar derivative (C-2) contained 1.0% N (D.B.) of which 0.54% was from the amino-monophosphonic acid substituent.

Guar Gum D—Derivative Containing Amino-Monophosphonic Acid and n-Butyl Groups A sample of guar gum was reacted in the same manner as above except that 15.4 parts of a 29.3% aqueous solution of Zwitterion Reageant D-2 (4.5 parts D.B.) and 7.6 parts of 50%, aqueous sodium hydroxide (3.8 parts D.B.) were used. The guar derivative contained 1.0% N (D.B.) of which 0.54% was from the amino-monophosphonic acid substituent.

Guar Gum E—Derivative Containing Amino-Monophosphonic Acid and Cyclohexyl Groups A sample of guar gum was reacted in the same manner as above except that 22.7 parts of a 19.9% aqueous solution of Zwitterion Reagent E-2 (4.5 parts D.B.) and 7.8 parts of 50 aqueous sodium hydroxide (3.9 parts D.B.) were used. The guar derivatives contained 0.76% N (D.B.).

EXAMPLE III

This example illustrates the preparation of the zwitterion locust bean gum derivative.

Locust Bean Gum A—Derivative Containing Amino-Diphosphonic Acid Groups

The procedure described in Example II for Guar Gum A was followed except guar gum was replaced by locust bean gum and 38.1 parts of 19.7% aqueous solution of Zwitterion Reagent A (7.5 parts D.B.) and 4.0 parts of 50% aqueous sodium hydroxide (2.0 parts D.B.) were used. The locust bean derivative contained 1.50% N(D.B.) of which 0.57% was from the aminodiphosphonic acid substituent. The control locust bean gum, reacted in the same manner except that Zwitterion Reagent A was omitted, contained 0.93% N(D.B.).

EXAMPLE IV

This example describes the preparation of another guar gum derivative.

Guar Gum F—Derivative Containing Amino-Diphosphonic Acid Groups

A sample of guar gum is reacted in the same manner as in Example II except that 25.5 parts of a 23.5% aqueous solution of Zwitterion Reagent B (6.0 parts D.B.) are used.

EXAMPLE V

This example illustrates the use of the zwitterion guar gum ether derivatives as pigment retention aids in the manufacture of paper.

Guar Gum A (derivative containing amino-diphosphonic acid groups) and Guar Gum C-1 (derivative containing amino-monophosphonic acid groups) were each added at a concentration of 0.25%, based on the weight of the dry pulp, to three bleached sulfite pulps which contained a varied amount of paper alum, i.e. aluminum sulfate. The three pulps contained 0%, 4.0%, and 11.0% alum, by weight based on the dry pulp. In each case, the pigment retention value of the test paper stock and those of the control and comparative sample were determined by first preparing paper sheets on the Williams Standard Sheet mold and then testing for the percent of titanium dioxide ($TiO_2$) retained by the method described in TAPPI Standard #T413 m. 58. The control consisted of unreacted guar gum. The comparative sample consisted of an amphoteric starch ether derivative of the prior art, i.e., the phosphorylated, diethylaminoethyl ether of corn starch, containing 0.32% nitrogen and 0.08% phosphorous by weight, prepared as described in U.S. Pat. No. 3,459,632.

The results are summarized in Table I. The data indicate that both guar gum derivatives are superior to the amphoteric starch derivative.

TABLE I

| Material Tested | %$TiO_2$ Retention in the presence of the following amounts of alum | | |
|---|---|---|---|
| | 0% | 4.0% | 11.0% |
| Guar Gum (control) | 65.9 | 54.2 | 54.6 |
| Amphoteric Starch Ether (comparative) | 53.8 | 60.8 | 54.8 |
| Guar Gum A | 66.5 | 66.1 | 72.4 |
| Guar Gum C-1 | 65.4 | 69.4 | 67.0 |

EXAMPLE VI

This example describes the preparation of modified zwitterion guar gum ether derivatives.

Part A - Derivatives Containing Cationic and Cationogenic Groups Guar Gum G—Derivative Containing Amino-Diphosphonic Acid Groups and Tertiary Amine Groups A cationic guar gum derivative containing diethyl aminoethyl ether groups is prepared by adding 30 parts of unpurified guar gum to 180 parts of 50% aqueous isopropanol, stirring the suspension for one hr at 40° C. under nitrogen, adding 3.6 parts of 50% aqueous sodium hydroxide, and stirring for 10 mins at 40° C. Then 2.4 parts of 50% aqueous 2-diethylaminoethylchloride hydrochloride are added, the mixture is stirred for 5 hrs at 40° C. The pH is then lowered to 8.0 with dilute acetic acid, and the derivative is recovered by filtration washed with 50% aqueous isopropanol and then with 100% isopropanol, and air dried.

The cationic guar gum derivative is then reacted with Zwitterion Reagent A using the same procedure and amounts used for the preparation of Guar Gum A of Example II. Guar Gum H—Derivative Containing Amino-Diphosphonic Acid Groups and Quaternary Ammonium Groups.

A cationic guar gum derivative containing 3-(trimethylammonium chloride-2-hydroxypropyl groups is prepared in the same manner as above except that 2.4 parts of 50% aqueous 3-chloro-2-hydroxypropyl trimethylammonium chloride are used instead of 2-diethylaminoethylchloride hydrochloride.

The cationic derivative is then reacted with Zwitterion Reagent A using the same procedure and amounts used for the preparation of Guar Gum A of Example II.

Part B - Derivative Containing Anionic Groups

Guar Gum I—Derivative Containing Amino-Diphosphonic Acid Groups and Carboxyalkyl Groups.

An anionic guar gum derivative containing carboxymethyl groups is prepared in the same manner as the cationic guar gum derivative described in the preparation of Guar Gum G except that the reaction temperature should be increased to 60° C. and 2.0 parts sodium chloroacetate are used instead of 2-diethylaminoethylchloride hydrochloride.

The anionic derivative is then reacted with Zwitterion Reagent A using the same procedure and amounts used for the preparation of Guar Gum A of Example II.

Part C - Derivative Containing Non-Ionic Groups

Guar Gum J—Derivative Containing Amino-Diphosphonic Acid Groups and 2-Hydroxypropyl Groups.

An non-ionic guar gum derivative containing 2-hydroxypropyl groups is prepared in the same manner as the anionic guar gum derivative described in the preparation of Guar Gum I except that 70% aqueous isopropanol is used instead of 50% aqueous isopropanol, 3.0 parts propylene oxide are used instead of sodium chloroacetate, and 1.8 parts of 50% aqueous sodium hydroxide are used instead of 3.6 parts of aqueous sodium hydroxide.

The non-ionic derivative is then reacted with Zwitterion Reagent A using the same procedure and amounts used for the preparation of Guar Gum A of Example I.

Summarizing, this invention is seen to provide novel zwitterion polygalactomannan ether derivatives containing amino-diphosphonic acid groups or amino-monophosphonic acid groups (or their salts) and modified zwitterion polygalactomannan derivatives containing non-ionic, anionic, cationic, or cationogenic groups.

Now that the preferred embodiments of the present invention have been described in detail, various modifications and improvements thereon will become readily apparent to those skilled in the art. Accordingly, the spirit and scope of the invention are to be limited only by the appended claims and not by the foregoing specifications.

What is claimed is:

1. As a composition of matter, a zwitterion polygalactomannan ether derivative of the general structure

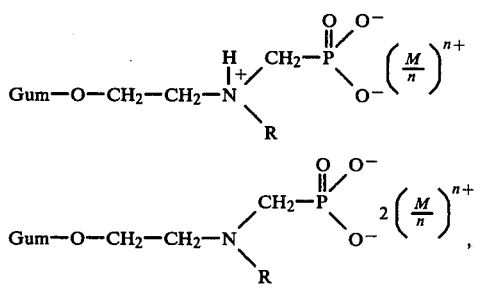

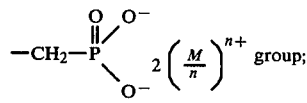

M is a cation; and n is the valence number of M.

2. The zwitterion derivative of claim 1, wherein M is hydrogen, an alkali, or an alkaline earth metal and said polygalactomannan is a guar gum or a locust bean gum.

3. The zwitterion derivative of claim 1, wherein R is an ethyl, n-butyl, or cyclohexyl group and M is sodium.

4. The zwitterion derivative of claim 1, wherein said polygalactomannan gum molecule contains non-ionic, anionic, cationic, or cationogenic groups and said polygalactomannan is a guar gum or a locust bean gum.

5. A derivative of claim 4, wherein said non-ionic groups are 2-hydroxypropyl ether groups, said anionic groups are carboxymethyl groups, and said cationic or catinogenic groups are 3-(trimethylammonium chloride)-2-hydroxypropyl ether groups or diethyl aminoethyl ether groups.

6. The zwitterion derivative of claim 5, wherein R is an ethyl, n-butyl, or cyclohexyl group and M is sodium.

7. A method for preparing a zwitterion polygalactomman ether derivative of the general structure

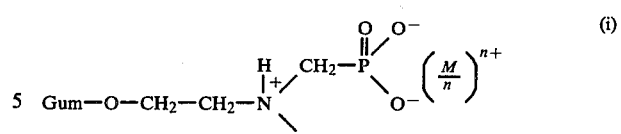

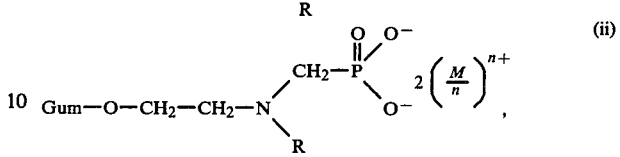

or a combination of (i) and (ii), wherein Gum-O represents a polygalactomanan gum molecule; R is a $C_1$–$C_6$ alkyl group, a $C_3$–$C_6$ cycloalkyl group or a

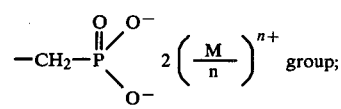

M is a cation; and n is the valence number of M, which comprises the steps of:

a. reacting a polygalactomannan gum base with about 0.1 to 100% by weight, based on the dry gum, of a zwitterion reagent having the general formula

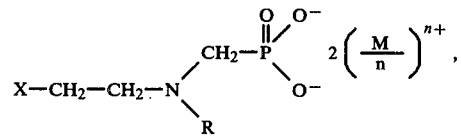

wherein X is chlorine or bromine, R is a $C_1$–$C_6$ alkyl group, a $C_3$–$C_6$ cycloalkyl group, or a

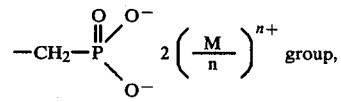

M is a cation, and n is the valence number of M; and b. isolating the resulting zwitterion polygalactomannan ether derivative.

8. The method of claim 7, wherein said reaction is carried out in an aqueous medium containing a water-miscible solvent and 0.05-20% excess alkali, based on the dry gum, at a temperature of 15°-100° C. for 0.5-8 hours.

9. The method of claim 7, wherein said reaction is carried out in aqueous isopropanol at a temperature of 20°-60° C. for 1-5 hours.

10. The method of claim 7, wherein said polygalactomannan gum is a guar gum or a locust bean gum, optionally containing non-ionic, anionic, cationic, or cationogenic groups.

11. The method of claim 10, wherein said gum contains 2-hydroxypropyl ethyl groups, carboxy methyl groups, 3-(trimethylammonium chloride)-2-hydroxypropyl ether groups, or diethyl aminoethyl ether groups.

12. The method of claim 7, wherein said zwitterion reagent is selected from the group consisting of N-(2-chloroethyl)iminobis(methylene)diphosphonic acid, N-(2-bromethyl)iminobis(methylene)diphosphonic acid, N-(ethyl)-N-(2-chloroethyl)aminomethylphosphonic acid, N-(n-butyl)-N-(2-chloroethyl)aminomethylphosphonic acid, and N-(cyclohexyl)-N-(2-chloroethyl)aminomethylphosphonic acid.

* * * * *